US007669125B2

(12) United States Patent
Smirnov

(10) Patent No.: US 7,669,125 B2
(45) Date of Patent: Feb. 23, 2010

(54) APPARATUS AND METHOD FOR ADAPTIVELY GENERATING TOOLTIP

(75) Inventor: Dmitry Evgenievich Smirnov, Volzhsky town (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 165 days.

(21) Appl. No.: 11/283,843

(22) Filed: Nov. 22, 2005

(65) Prior Publication Data

US 2006/0123341 A1 Jun. 8, 2006

(30) Foreign Application Priority Data

Nov. 23, 2004 (RU) .............................. 2004133946

(51) Int. Cl.
*G06F 3/00* (2006.01)
*G06F 3/048* (2006.01)
(52) U.S. Cl. ...................... 715/705; 715/708; 715/711; 715/714
(58) Field of Classification Search .......... 715/705–715
See application file for complete search history.

(56) References Cited

U.S. PATENT DOCUMENTS

| 5,434,965 | A |   | 7/1995  | Matheny et al. ............. 715/710 |
|-----------|---|---|---------|-------------------------------------|
| 5,546,521 | A | * | 8/1996  | Martinez ..................... 715/711 |
| 5,617,526 | A | * | 4/1997  | Oran et al. ................... 715/779 |
| 5,877,758 | A | * | 3/1999  | Seybold ....................... 715/866 |
| 5,995,101 | A |   | 11/1999 | Clark et al. ................. 715/711 |
| 6,281,879 | B1| * | 8/2001  | Graham ....................... 345/157 |
| 6,452,607 | B1| * | 9/2002  | Livingston .................. 715/705 |
| 6,504,556 | B1| * | 1/2003  | Myers ......................... 715/839 |
| 6,542,163 | B2|   | 4/2003  | Gorbet et al. ............... 715/711 |
| 6,542,164 | B2| * | 4/2003  | Graham ....................... 715/711 |
| 6,615,346 | B1| * | 9/2003  | Kawamoto ................... 713/100 |
| 6,717,589 | B1| * | 4/2004  | Grillo et al. ................. 715/715 |
| 6,938,214 | B2| * | 8/2005  | Proulx et al. ................ 715/763 |
| 2002/0118221 | A1 |   | 8/2002 | Hudson et al.                      |

(Continued)

FOREIGN PATENT DOCUMENTS

JP 8-115194 5/1996
JP 11-73264 3/1999

OTHER PUBLICATIONS

Chinese Office Action issued on Mar. 28, 2008, in Chinese Patent Application No. 2005101248753 (in Chinese with complete English translation).

(Continued)

*Primary Examiner*—Tadeese Hailu
(74) *Attorney, Agent, or Firm*—Stein McEwen, LLP

(57) ABSTRACT

A method and apparatus are provided for adaptively generating a tooltip to be displayed in association with an object, such as a push button or a check box, according to the state of the object. The method comprises determining a current state of the object; and generating a tooltip to be displayed in association with the object according to the current state of the object. Since a tooltip is adaptively generated for an object included in a GUI and is automatically displayed in association with the object, it is possible to conveniently control a device with reference to the tooltip without the need to additionally refer to instructions regarding the GUI.

19 Claims, 7 Drawing Sheets

U.S. PATENT DOCUMENTS

2004/0004632 A1* 1/2004 Knight et al. ............... 345/711
2005/0018236 A1* 1/2005 Shirai et al. ............... 358/1.14
2005/0097238 A1* 5/2005 Oomori et al. ............... 710/15
2006/0041858 A1* 2/2006 Yan et al. ............... 717/105

OTHER PUBLICATIONS

Office Action issued in Chinese Patent Application No. 200510124875.3 on Sep. 21, 2007.

* cited by examiner

US 7,669,125 B2

APPARATUS AND METHOD FOR ADAPTIVELY GENERATING TOOLTIP

CROSS-REFERENCE TO RELATED APPLICATIONS

This application claims all benefits accruing under 35 U.S.C. §119 from Russian Patent Application No. 2004133946, filed on 23 Nov. 2004, in the Russian Intellectual Property Office, the disclosure of which is incorporated by reference herein.

BACKGROUND OF THE INVENTION

1. Field of the Invention

The present invention relates to a graphic user interface (GUI), and more particularly, to an apparatus and a method for generating a tooltip displayed by a GUI.

2. Related Art

Graphic user interfaces (GUIs) are program interfaces that allow a user to take advantage of a computer's graphics capabilities to make a program easier to use. GUIs have been developed to reduce the inconvenience of typical user interfaces which require a user to input data using a keyboard and to memorize a considerable number of complex commands.

Most of the existing operating systems support GUIs, and many application programs use specific GUI elements with different features to display information or allow the user to interact with the program. Examples of operating systems (OS) that support GUIs are Apple Mac OS, Microsoft Windows (Windows 95, Windows XP or Windows 2000), NEXTSTEP and the X Window system. Examples of basic GUI elements include windows, menus, buttons, check boxes, pointers, icons and other gadgets used to carry out commands such as open files, delete files, move files, etc., without learning complex command languages. For example, a pointer is a symbol that appears on a display screen and that can be moved by a user, via a pointing device such as a mouse or trackball, to select objects and commands on the display screen. An icon is a small picture that represents commands, files or windows and that can be moved by the user, via a pointing device, around the display screen. If the pointer is moved to the icon and a mouse button is pressed, a command can be executed or the icon can be converted into a window.

A user may set options in a computer or an external device connected to the computer or may control the operation of the computer or the external device by using a GUI. In order to enable a user to input certain values using a GUI, the GUI must include various input tools, such as a push button, a radio button, a combo box, and a check box. Accordingly, a user can operate such input tools of the GUI using a pointing device such as a mouse or trackball, thereby controlling the computer or the external device.

The size of a GUI is generally limited so that a plurality of functions provided by an input tool of the GUI cannot be displayed all together on a display screen. Therefore, a user is required to additionally refer to instructions regarding the GUI and then determine which of the functions should be used. Accordingly, tooltips, which are special GUI features, have been utilized to temporarily display all of a plurality of functions provided by an input tool of the GUI when a user places a pointer over an icon representing the input tool using a pointing device such as a mouse or trackball. For instance, when the user places a mouse cursor over an item, without clicking it, a small box or window appears with a name or description of the item, usually in a one line help text.

FIG. 1 is a diagram showing an example of a conventional GUI using a tooltip, i.e., "Layout Options". Referring to FIG. 1, the GUI "Layout Options" 100 is used for setting print layout options for an image forming apparatus, such as a printer or a photocopier. If a user sets an object "Type" 110 included in the GUI "Layout Options" 100 to "Multiple Pages per Side" using a combo box 120, which is an input tool included in the GUI "Layout Options" and then places a pointer 140 near an object "Pages per Side" 130 below the combo box 120 of the object "Type" 110 using a pointing device such as a mouse, a brief description of a function provided by the object "Pages per Side" 120 is displayed. In other words, a tooltip 150 stating "Select number of pages per paper side" is displayed on a display screen.

A computer operating system (OS) displays a tooltip generally in association with an object. In other words, an object is associated with only one tooltip regardless of what the current object is and the current state of a GUI. Therefore, a user may not obtain sufficient information regarding a function currently provided by an object from a tooltip associated with the object.

In addition, if a plurality of values input by a user using different input tools of a GUI contradict one another, or if a device internally or externally connected to a computer malfunctions, the user may not be able to input data to some of a plurality of input tools included in the GUI. In this case, the input tools which the user cannot input data to may be gray or blurry to indicate that they are not available.

FIG. 2 is a diagram showing another example of the GUI "Layout Options" shown in FIG. 1. Referring to FIG. 2, if a user sets the object "Pages per Side" 130 to "2" or greater, the user may be required to determine whether to print "Print Page Border", via a check box 160. However, if the object "Pages per Side" 130 is set to "1" as illustrated in FIG. 2, an object 'Print Page Border' with a check box 160 for determining whether to print "Print Page Borders" may not be available. In order to activate the object "Print Page Border" 130, the user must set the object "Pages per Side" 130 to "2" or greater.

However, as described with reference to FIG. 1 and FIG. 2, if an input tool of a GUI is inactive, a user may not know how to activate the input tool or determine what made the input tool inactive.

According, there is a need for creating a tooltip for a GUI element or object that is adaptively varied based on the state of such a GUI element or object so as to conveniently control a device without the need to refer to additional instructions regarding the GUI.

SUMMARY OF THE INVENTION

Various aspects and example embodiments of the present invention provide an apparatus and a method for adaptively generating a tooltip in which a tooltip that adaptively varies according to the state of a graphic user interface (GUI) element or an object is generated and then displayed on a display screen, thereby helping a user to conveniently input data to the GUI.

Additional aspects and/or advantages of the invention will be set forth in part in the description which follows and, in part, will be obvious from the description, or may be learned by practice of the invention.

According to an aspect of the present invention, a method of generating a tooltip to be displayed in association with an object included in a graphic user interface (GUI) is provided. Such a method comprises: determining a current state of an object; and generating a tooltip to be displayed in association with the object according to the current state of the object.

The current state of the object may include information regarding a function provided by the object. The current state of the object may be determined based on at least one of information indicating whether the object is activated so that data can be input thereto, information regarding current states of other objects included in the GUI, information regarding a current state of a device controlled by the GUI, current data information, current time information, information regarding values input to the objects included in the GUI by a user, and information regarding an asynchronous event that has occurred in the GUI.

The tooltip contains help text for specifying how to activate the object if the object is determined to be inactivated. Such a tooltip may be generated by reading one of a plurality of sentences stored in a storage unit.

The method may also include applying the tooltip to the object using an operating system of a host device in which the GUI is executed. In addition, the method may further include: determining whether the current state of the object has changed; and generating a new tooltip for the object based on changes in the current state of the object if the current state of the object is determined to have changed. If the current state of the object is determined to have changed, newly determining the current state of the object; determining whether to generate a new tooltip for the object based on the newly determined current state of the object; and generating a new tooltip for the object based on based on the newly determined current state of the object if there is a need to generate a new tooltip for the object.

According to another aspect of the present invention, there is provided a computer-readable recording medium storing a computer program for executing the method.

According to yet another aspect of the present invention, an apparatus is provided for generating a tooltip to be displayed in association with an object included in a graphic user interface (GUI). The apparatus comprises: a state determination unit which determines a current state of the object; and a tooltip generation unit which generates a tooltip to be displayed in association with the object according to the current state of the object.

The state determination unit may determine the current state of the object based on at least one of information indicating whether the object is activated so that data can be input thereto, information regarding current states of other objects included in the GUI, information regarding a current state of a device controlled by the GUI, current data information, current time information, information regarding values input to the objects included in the GUI by a user, and information regarding an asynchronous event that has occurred in the GUI.

The tooltip generation unit may generate a tooltip containing help text for specifying how to activate the object if the state determination unit determines the object as being inactivated.

The apparatus may also include a display unit which displays the tooltip generated by the tooltip generation unit in association with the object.

The tooltip generated by the tooltip generation unit may be displayed at a location where a pointer is placed.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
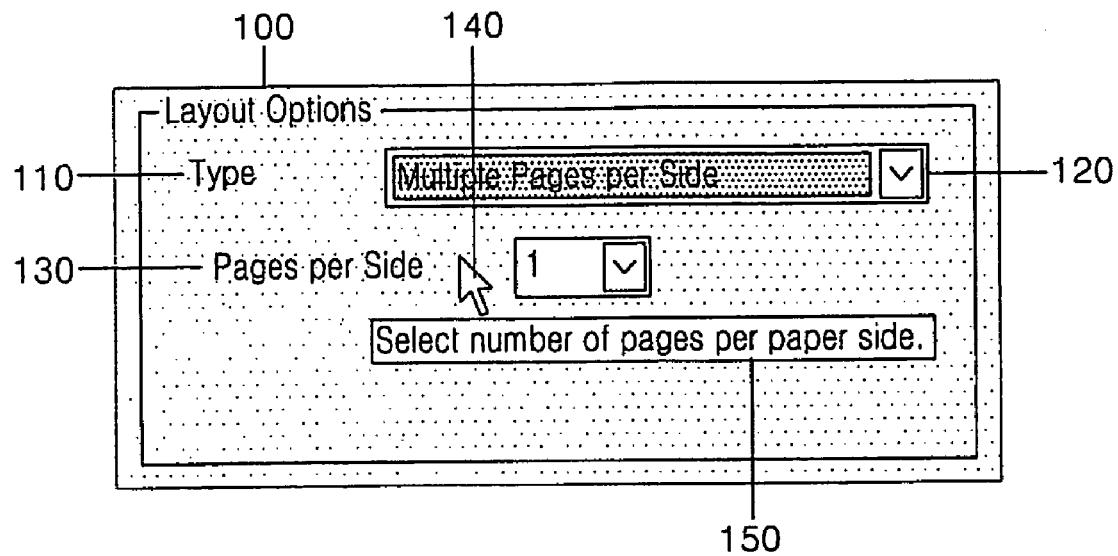
FIG. 1 is a diagram showing an example of a conventional graphic user interface (GUI)
Figure 2:
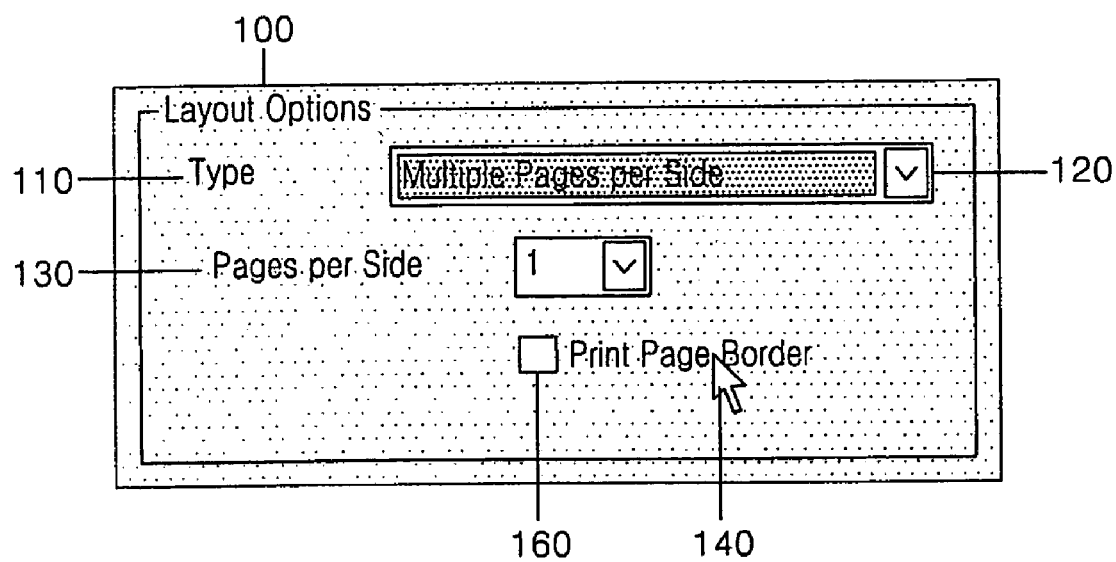
FIG. 2 is a diagram showing another example of the conventional GUI.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
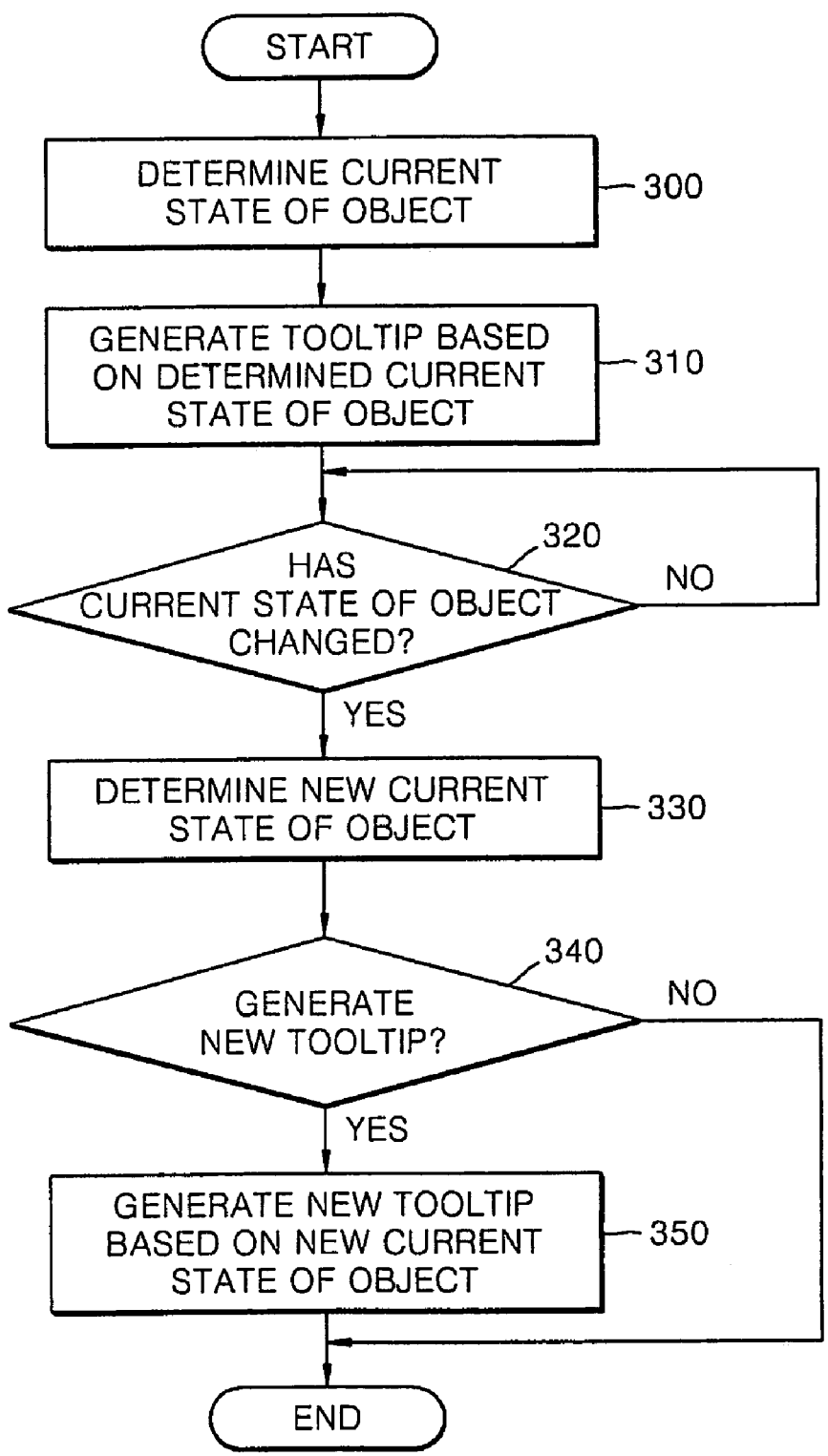
FIG. 3 is a flowchart illustrating a method of adaptively generating a tooltip according to an example embodiment of the present invention.
Figure 4:
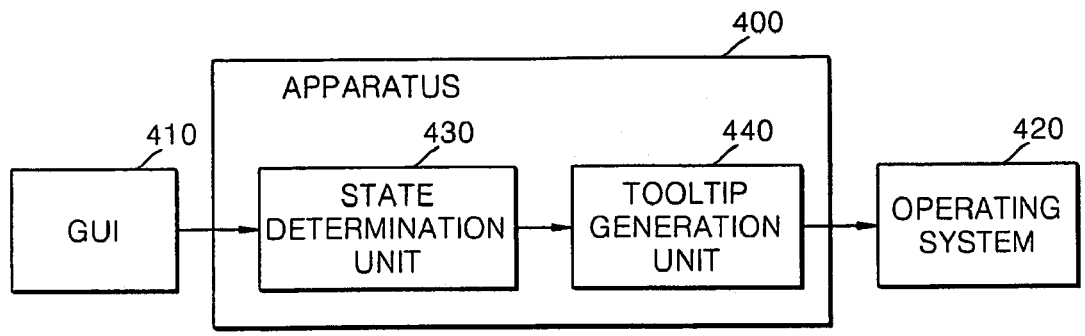
FIG. 4 is a block diagram of an apparatus for adaptively generating a tooltip according to an example embodiment of the present invention.

FIG. 3 is a flowchart illustrating a method of adaptively generating a tooltip according to an example embodiment of the present invention, and FIG. 4 is a block diagram of an apparatus 400 for adaptively generating a tooltip according to an example embodiment of the present invention. Such an apparatus 400, as shown in FIG. 4, is arranged between a graphic user interface (GUI) 410 and an operating system (OS) 420 for adaptively generating a tooltip.

Referring to FIG. 4, the apparatus 400 includes a state determination unit 430 for determining a current state of an object, and a tooltip generation unit 440 for generating a tooltip 560 (see FIGS. 5A-5B, 6A-6D, 7A-7B, and 8A-8C) to be displayed in association with an object according to the current state of the object.

A graphic user interface (GUI) 410 comprises a text input unit (not shown) which enables a user to input specific values to the GUI 410 and a plurality of objects (not shown) on a display screen each providing a string of values that can be input thereto using the text input unit. When the user places a pointer over one of the objects on a display screen using a pointing device, for example, a mouse, trackball, or touch-screen, a tooltip associated with the object being pointed to by the pointer is automatically displayed on a display screen.

The method illustrated in FIG. 3 will now be described in detail with reference to FIG. 4.

Figure 5A:
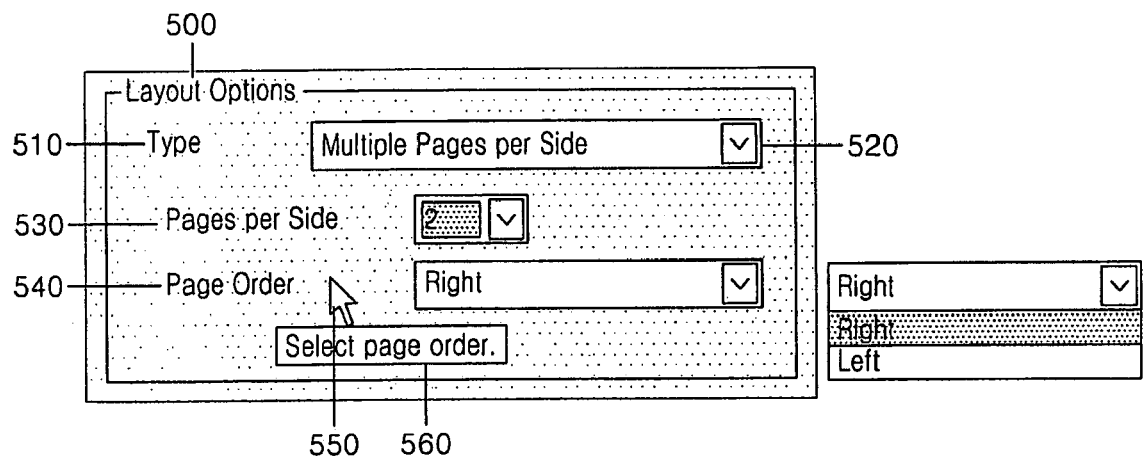
FIGS. 5A and 5B are diagrams showing examples of a GUI using a tooltip according to an embodiment of the present invention.

Referring to FIGS. 3 and 4, if the apparatus 400 generates a tooltip displayed in association with each of the objects included in the GUI 410, an operating system (OS)420 applies the tooltips generated by the apparatus 400 to the respective objects. FIG. 5A illustrates an example of a GUI 410 using a tooltip according to an embodiment of the present invention. Referring to FIG. 5A, an example GUI "Layout Options" 500 is used for setting print layout options for an image forming apparatus, such as a printer or a photocopier. Such GUI "Layout Options" 500 include an object "Type" 510, which can be set using a combo box 520, an object "Pages per Side" 530, and an object "Page Order" 540. When a user places a pointer 550 over an object "Page Order" 540 for determining an order in which a plurality of pages are to be printed after setting an object "Pages per Side" 530 to "2", a tooltip specifying a function provided by the object "Page Order", i.e., a tooltip 560 stating "Select page order" is displayed on a display screen, so the user can choose one of "Right" and "Left" functions from the object "Page Order" 540.

Figure 5B:
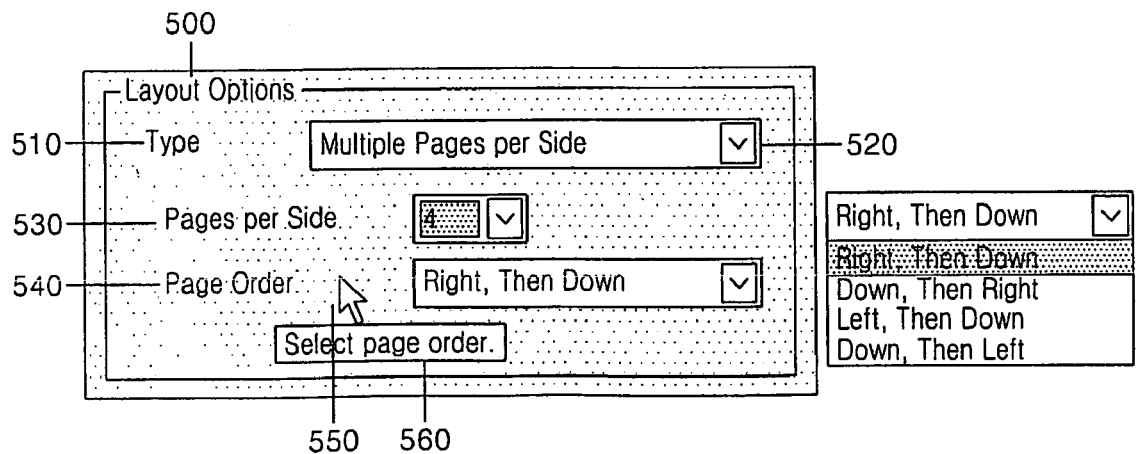

FIG. 5B illustrates another example of the GUI using a tooltip according to an embodiment of the present invention. Referring to FIG. 5B, when a user places a pointer 550 over an object "Page Order" 540 after setting an object "Pages per Side" 530 to "4", the tooltip specifying the function provided by the object "Page Order", i.e., the tooltip 560 stating "Select page order", is displayed on a display screen, so the user can choose one of "Right, Then Down", "Down, Then Right", "Left, Then Down", and "Down, Then Left" functions from the object "Page Order" 540.

Referring to FIG. 3, in operation 300, the state determination unit 430 determines a current state of one of the objects (hereinafter referred to as a current object) included in the GUI 410 for which a tooltip is to be generated. The current state of the current object may include information specifying a function provided by the current object, and information indicating whether a user can input data to the current object, i.e., whether the current object is activated or inactivated. The state determination unit 430 may determine the current state of the current object based on a string of values that can be input to the current object or a string of values that have already been input to the current object.

The current state of the current object may be determined based on the states of external factors that may affect the current object. For example, the state determination unit 430 may receive information regarding external factors, such as information regarding the states of objects other than the current object, the state of a device controlled by the GUI 410, and current date or time information, and may determine the current state of the current object based on the received information. The states of objects other than the current object may include values input to the objects other than the current object, and information indicating whether the objects other than the current object are activated or inactivated.

In operation 310, the tooltip generation unit 440 generates a tooltip to be displayed in association with the current object with reference to the current state of the current object determined by the state determination unit 430. The tooltip generated by the tooltip generation unit 440 is applied to the current object by the operating system 420.

In operation 310, the tooltip generation unit 440 may generate a tooltip by choosing one of a plurality of sentences previously stored in a memory (not shown) that describes the current state of the current object or generating a sentence describing the current state of the current object.

If the current object is inactivated so that the user cannot input any data thereto, the tooltip generation unit 440 may generate a tooltip specifying how to activate the current object based on the current state of the current object. In detail, the tooltip generation unit 440 may examine what made the current object inactive based on values input to the objects other than the current object, information indicating whether the objects other than the current object are activated or inactivated, or information regarding the state of the device controlled by the GUI 410. The tooltip generation unit 440 may also determine how to activate the current object based on the examined results, and may generate a tooltip specifying the determined results for the current object.

The values input to the objects other than the current object, the information indicating whether the objects other than the current object are activated or inactivated, the information regarding the state of the device controlled by the GUI 410, information specifying the reason why the current object has been inactivated, and information specifying how to activate the current object may be stored in a memory (not shown). In this case, the tooltip generation unit 440 may read the information specifying how to activate the current object from the memory and then generate a tooltip for the current object with reference to the read information.

Figure 6A:
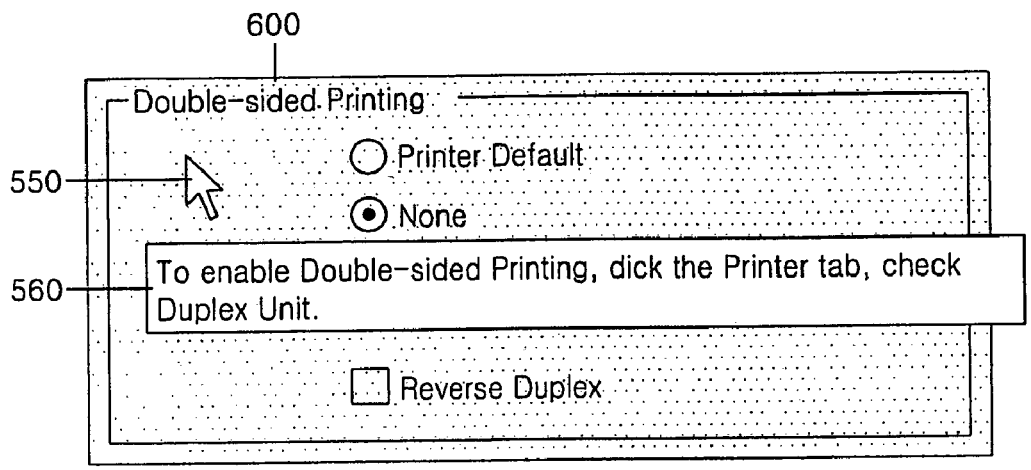
FIGS. 6A through 6D are diagrams showing examples of a GUI using an adaptive tooltip for activating an object according to an embodiment of the present invention.

FIGS. 6A through 6D are diagrams showing examples of a tooltip generated for an inactive object included in a GUI according to an embodiment of the present invention. Referring to FIG. 6A, objects included in a GUI "Double-sided Printing" are inactivated because of inappropriate printer settings, particularly, inappropriate duplex unit settings. Therefore, when a user places a pointer 550 over the object "Double-sided Printing" 600, a tooltip 560 stating "To enable Double-sided Printing, click the Printer Tab, check Duplex Unit" is displayed on a display screen to help the user to correct the inappropriate printer settings and activate the GUI "Double-sided Printing" function.

Figure 6B:
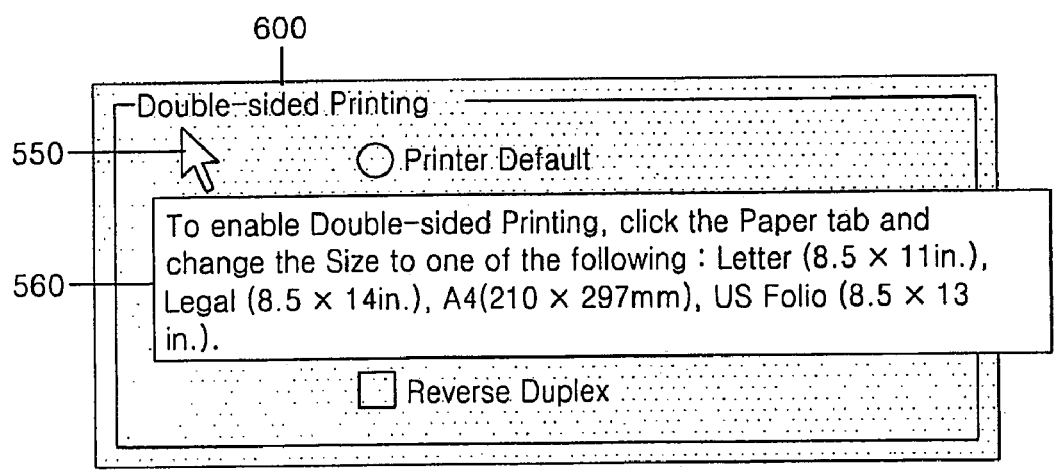

Referring to FIG. 6B, the objects included in the GUI "Double-sided Printing" are inactivated because of inappropriate paper size settings. Therefore, when a user places a pointer 550 over the object "Double-sided Printing" 600, a tooltip 560 stating "To enable Double-sided Printing, click the Paper tab and change the Size to one of the following: Letter (8.5×11 in.), Legal (8.5×14 in.), A4 (210×297 mm), and US Folio (8.5×13 in.)" is displayed on a display screen to help the user to correct the inappropriate paper size settings and activate the GUI "Double-sided Printing" function.

Figure 6C:
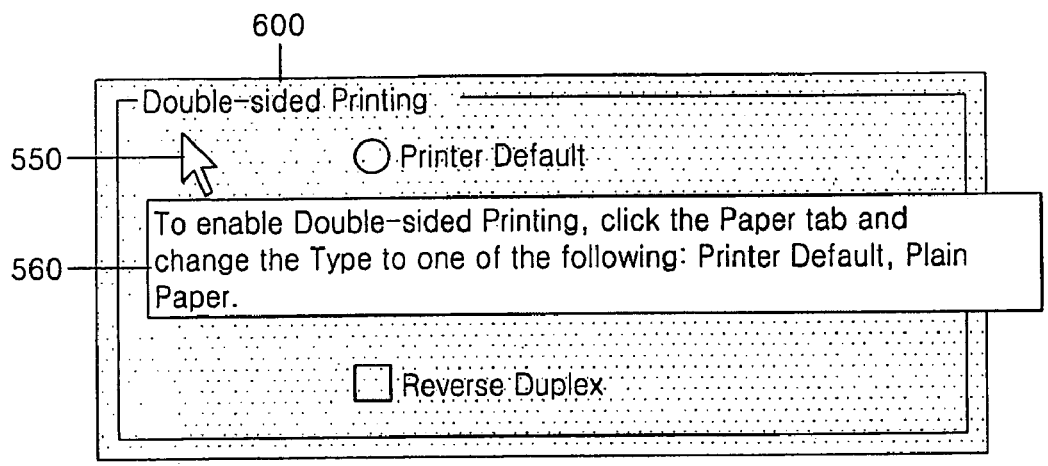

Referring to FIG. 6C, the objects included in the GUI "Double-sided Printing" are inactivated because of inappropriate paper type settings. Therefore, when a user places a pointer 550 over the object "Double-sided Printing" 600, a tooltip 560 stating "To enable Double-sided Printing, click the Paper tab and change the Type to one of the following: Printer Default, Plain Paper" is displayed on a display screen to help the user to correct the inappropriate paper type settings and activate the GUI "Double-sided Printing" function.

Figure 6D:
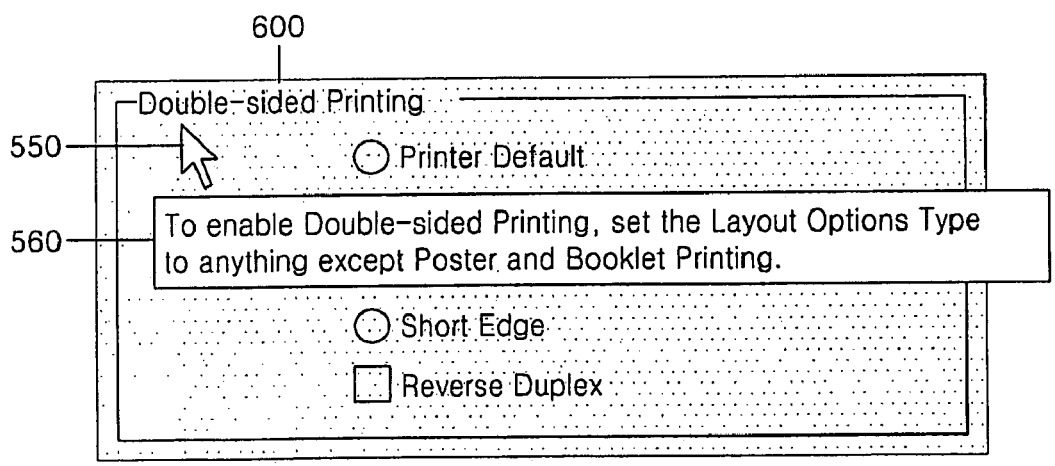

Referring to FIG. 6D, the objects included in the GUI "Double-sided Printing" are inactivated because of inappropriate layout options type settings. Therefore, when a user places a pointer 550 over the object "Double-sided Printing" 600, a tooltip 560 stating "To enable Double-sided Printing, set the Layout Options Type to anything except Poster and Booklet Printing" is displayed on a display screen to help the user to correct the inappropriate layout options type settings and activate the GUI "Double-sided Printing" function.

If the current object is activated, the tooltip generation unit 440 may generate a tooltip specifying a function provided by the current object with reference to the current state of the current object.

Figure 7A:
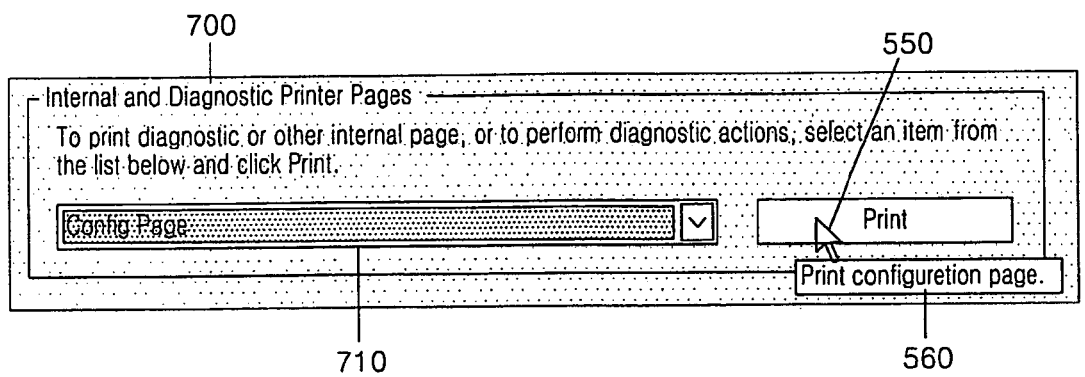
FIGS. 7A and 7B are diagrams showing examples of a GUI using an adaptive tooltip having a function provided by an object according to an embodiment of the present invention.
Figure 7B:
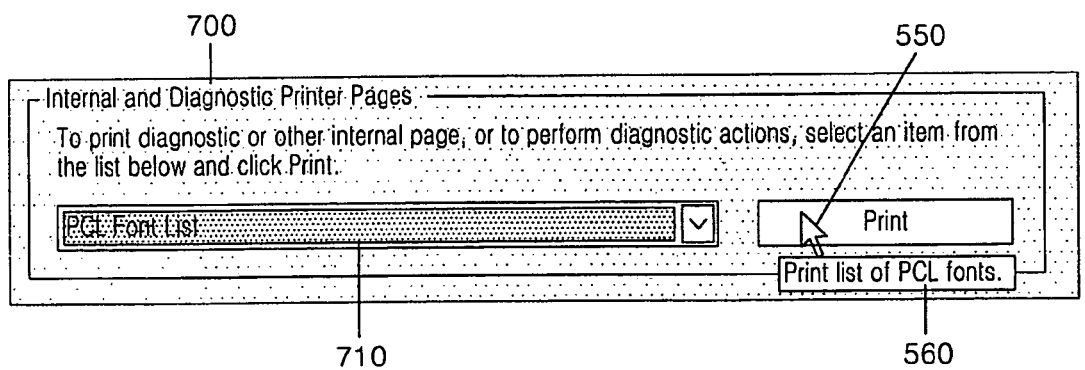

FIGS. 7A and 7B are diagrams showing examples of a tooltip generated for an object in a GUI to specify a function provided by the object according to an embodiment of the present invention. Referring to FIG. 7A, if a user chooses "Config Page" from a combo box 710 for a GUI "Internal and Diagnostic Printer Pages" 700, and places a pointer 550 over a "Print" button, a tooltip 560 stating "Print configuration page" is displayed near the "Print" button on a display screen.

Referring to FIG. 7B, if the user chooses "PCL Font List" from the combo box 710 for the GUI "Internal and Diagnostic Printer Pages" 700, and places a pointer 550 over a "Print" button, a tooltip 560 stating "Print list of PCL fonts" is displayed near the "Print" button on a display screen.

Figure 8A:
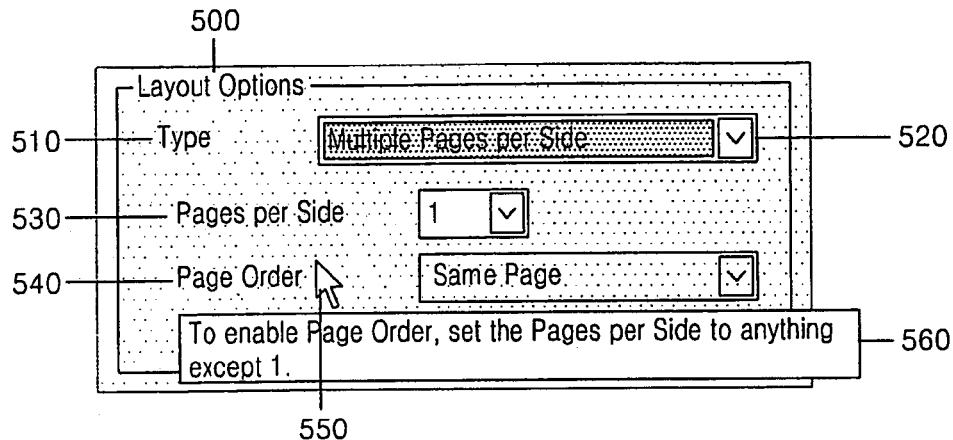
FIGS. 8A through 8C are diagrams showing examples of a GUI that adaptively generates a tooltip according to whether an object associated with the tooltip is activated or inactivated and displays the tooltip according to an embodiment of the present invention.
Figure 8B:
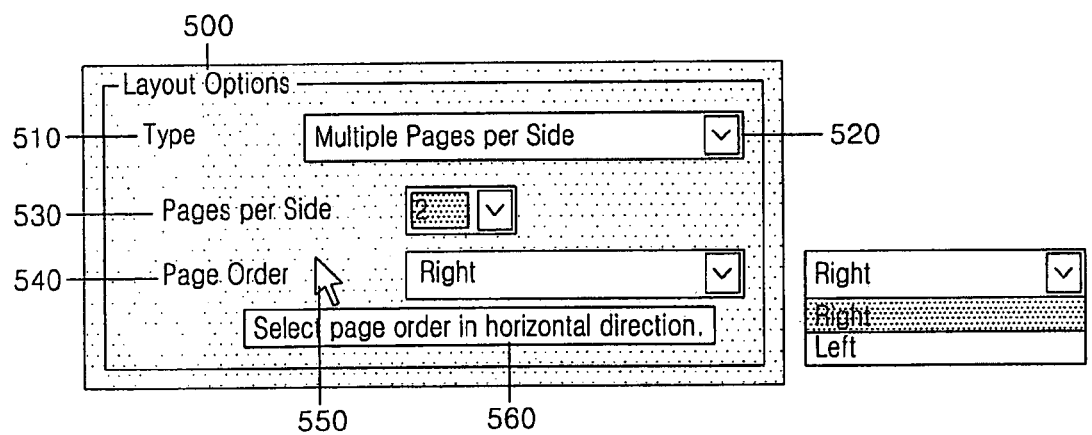
Figure 8C:
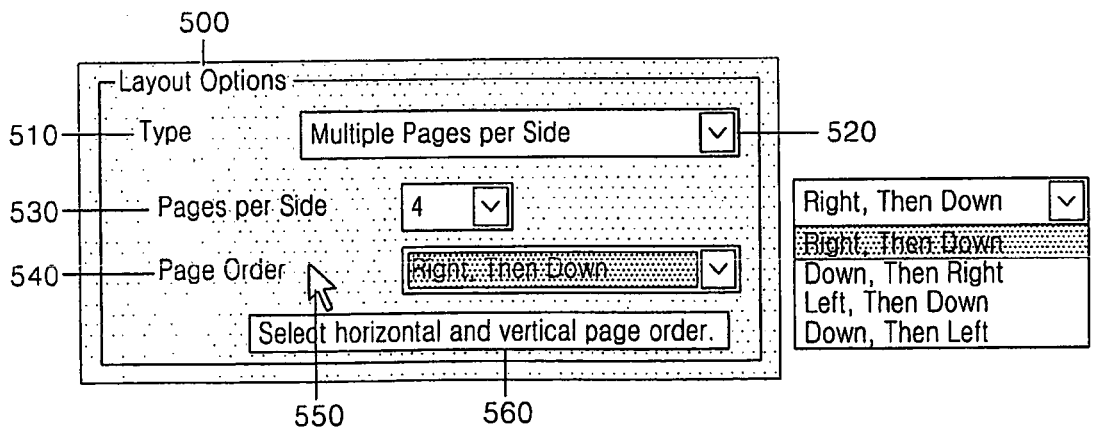

FIGS. 8A through 8C are diagrams showing examples of a GUI that adaptively generates a tooltip for an object according to whether the object is activated or inactivated and displays the tooltip according to an embodiment of the present invention. Referring to FIG. 8A, if a user sets an object "Type" 510 of a GUI "Layout Options" 500 to "Multiple Pages per Side" 520 and sets an object "Pages per Side" 530 to "1", an object "Page Order" 540 for determining an order in which a plurality of pages are to be printed is inactivated. If the user places a pointer 550 over the object "Page Order" 540 using a mouse, a tooltip 560 stating "To enable Page Order, set the Pages per Side to anything except 1" is displayed on a display screen to help the user to activate the "Page Order" function.

Referring to FIG. 8B, if the user sets the object "Type" 510 to "Multiple Pages per Side" 520 and sets the object "Pages per Side" 530 to "2", the object "Page Order" 540 is activated. If the user places a pointer 550 over the object "Page Order" 540 using a mouse for determining an order in which a plurality of pages are to be printed after setting the object "Pages per Side" 530 to "2", a tooltip 560 stating "Select page order in horizontal direction" is displayed on a display screen to help the user to select one of "Right" and "Left" from the object "Page Order" 540.

Referring to FIG. 8C, if the user sets the object "Type" 510 to "Multiple Pages per Side" 520 and the object "Pages per Side" 530 to "4", the object "Page Order" 540 is activated, and a tooltip 560 stating that "Select horizontal and vertical page order" is displayed on a display screen to help the user to select one of "Right, Then Down", "Down, Then Right", "Left, Then Down" and "Down, Then Left" functions.

Referring back to FIG. 3, in operation 320, the state determination unit 430 determines whether the current state of the current object has changed since operation 300. In operation 330, if the current state of the current object has changed since operation 300, the state determination unit 430 determines a new current state of the current object. The current state of the current object may change when the values input to the objects included in the GUI 410 are changed by the user or when an unintentional asynchronous event occurs. The unintentional asynchronous event may be malfunctioning of the device controlled by the GUI 410. The state determination unit 430 detects changes in the values input to the objects included in the GUI 410 or in the state of the device controlled by the GUI 410.

In operation 340, the tooltip generation unit 440 determines whether to generate a new tooltip for the current object based on the changes in the state of the current object detected in operation 330. In operation 350, if a new tooltip is determined to be generated for the current object in operation 340, the tooltip generation unit 440 generates a new tooltip based on the new current state of the current object determined in operation 330.

Operations 320 through 350 may be repeatedly performed while the GUI 410 is executed.

Various aspects and embodiments of the present invention can be written as computer programs and can be implemented in general-use digital computers that execute the computer programs using a computer-readable recording medium. Examples of the computer-readable recording medium include magnetic storage media (e.g., ROM, RAM, floppy disks, hard disks, etc.), optical recording media (e.g., CD-ROMs, DVDs, etc.), and other types of storage media. The computer-readable recording medium can also be distributed over network-coupled computer systems so that the computer-readable code is stored and executed in a distributed fashion. Functional programs, codes, and code segments for embodying the present invention may be easily written by programmers in the art of the present invention.

In addition, both the apparatus and method for adaptively generating a tooltip, as shown in FIG. 3 and FIG. 4, can be implemented as a library, or an application framework providing GUI elements. The apparatus 400, as shown in FIG. 4, can be a software module written in different computer programming languages, including, but not limited to C, C++, C#, Java and Delphi, and can be integrated in either the operating system (OS) 420 or the GUI 410, or alternatively, resides as a separate layer on top of the operating system (OS) 420 or the GUI 410.

As described in connection with FIG. 3, FIG. 4, FIGS. 5A-5B, FIGS. 6A-6D, FIGS. 7A-7B, and FIGS. 8A-8C of the present invention, a tooltip is adaptively generated for an object included in a GUI and is automatically displayed in association with the object. Such a tooltip provides a short pop-up description of instructions or help text when the mouse cursor rests momentarily on a GUI element or object. Thus, it is possible to conveniently control a device (internal or external) with reference to the tooltip without the need to additionally refer to instructions regarding the GUI.

While there have been illustrated and described what are considered to be example embodiments of the present invention, it will be understood by those skilled in the art that various changes in form and modification may be made therein, and equivalents may be substituted for elements thereof without departing from the spirit and scope of the present invention. For example, the GUI element as described in connection with FIGS. 5A-5B, FIGS. 6A-6D, FIGS. 7A-7B, and FIGS. 8A-8C can vary, so long as a tooltip is adaptively generated in response thereto. Likewise, a tooltip window can be made smaller or larger with one or more lines of help text to help the user to activate a specific GUI element. Similarly, a central controller can be implemented as a chipset, or alternatively, a general or special-purpose computer programmed to perform the methods as described with reference to FIG. 3. Accordingly, it is intended, therefore, that that present invention not be limited to the various example embodiments disclosed, but that the present invention includes all embodiments falling within the scope of the appended claims.

What is claimed is:

1. A method of generating a tooltip to be displayed on a display screen providing for selection of print layout options in a graphic user interface (GUI), the method comprising:
   determining a current state of an object of the GUI displayed on the display screen, the object comprising a print layout option selecting feature that a user uses to select one of the print layout options using a pointer of the GUI; and
   generating a tooltip to be displayed on the display screen in association with the object based on the current state of the object, the tooltip being generated when the user places the pointer over the object;

wherein the tooltip contains help text that depends on the current state of the object.

2. The method as claimed in claim 1, wherein the current state of the object comprises information regarding a function provided by the object.

3. The method as claimed in claim 1, wherein the current state of the object is determined based on any one or any combination of information indicating whether the object is activated so that data can be input thereto, information regarding current states of other objects of the GUI, information regarding a current state of a device controlled by the GUI, current data information, current time information, information regarding values input to objects of the GUI by a user, and information regarding an asynchronous event that has occurred in the GUI.

4. The method as claimed in claim 3, wherein the help text explains how to activate the object if the current state of the object is that the object is inactivated.

5. The method as claimed in claim 1, wherein the tooltip is generated by reading one of a plurality of text phrases respectively corresponding to a plurality of different states of the object stored in a storage unit.

6. The method as claimed in claim 1, further comprising applying the tooltip to the object using an operating system (OS) of a host device in which the GUI is executed.

7. The method as claimed in claim 1, further comprising:
 determining whether the current state of the object has changed; and
 generating a new tooltip for the object based on changes in the current state of the object if the current state of the object has changed.

8. The method as claimed in claim 7, wherein the generating of a new tooltip comprises:
 determining a new current state of the object if the current state of the object has changed;
 determining whether it is necessary to generate a new tooltip for the object based on the new current state of the object; and
 generating a new tooltip for the object based on the new current state of the object if it is necessary to generate a new tooltip for the object.

9. The method as claimed in claim 1, wherein the help text is different for different states of the object.

10. An apparatus for generating a tooltip to be displayed on a display screen providing for selection of print layout options in a graphic user interface (GUI), the apparatus comprising:
 a state determination unit to determine a current state of an object of the GUI displayed on the display screen, the object comprising a print layout option selecting feature that a user uses to select one of the print layout options using a pointer of the GUI; and
 a tooltip generation unit to generate a tooltip to be displayed on the display screen in association with the object based on the current state of the object, the tooltip being generated when the user places the pointer over the object;
 wherein:
  the tooltip contains help text that depends on the current state of the object; and
  the state determination unit and the tooltip generation unit are implemented as hardware or as a computer program stored on a computer-readable medium readable by the apparatus.

11. The apparatus as claimed in claim 10, wherein the state determination unit determines the current state of the object based on any one or any combination of information indicating whether the object is activated so that data can be input thereto, information regarding current states of other objects of the GUI, information regarding a current state of a device controlled by the GUI, current data information, current time information, information regarding values input to objects of the GUI by a user, and information regarding an asynchronous event that has occurred in the GUI.

12. The apparatus as claimed in claim 11, wherein the help text explains how to activate the object if the current state of the object is that the object is inactivated.

13. The apparatus as claimed in claim 10, further comprising a display unit to display the tooltip generated by the tooltip generation unit on the display screen in association with the object.

14. The apparatus as claimed in claim 10, wherein the tooltip generated by the tooltip generation unit is to be displayed on the display screen at a location where the pointer is placed.

15. An apparatus for generating a tooltip to be displayed on a display screen providing for selection of print layout options in a graphical user interface (GUI), the apparatus comprising:
 a state determination unit to determine a current state of an object of the GUI displayed on the display screen, including determining when the current state of the object has changed, the object comprising a print layout option selecting feature that a user uses to select one of the print layout options using a pointer of the GUI; and
 a tooltip generation unit to generate a tooltip to be displayed on the display screen in association with the object based on the current state of the object, including generating a new tooltip for the object based on changes in the current state of the object, the tooltip being generated when the user places the pointer over the object;
 wherein:
  the tooltip contains help text that depends on the current state of the object; and
  the state determination unit and the tooltip generation unit are implemented as hardware or as a computer program stored on a computer-readable medium readable by the apparatus.

16. The apparatus as claimed in claim 15, wherein the current state of the object comprises information regarding a function provided by the object, and/or information indicating whether the object is activated or inactivated.

17. The apparatus as claimed in claim 15, wherein the state determination unit determines the current state of the object based on any one or any combination of information indicating whether the object is activated so that data can be input thereto, information regarding current states of other objects of the GUI, information regarding a current state of a device controlled by the GUI, current data information, current time information, information regarding values input to objects of the GUI by a user, and information regarding an asynchronous event that has occurred in the GUI.

18. The apparatus as claimed in claim 15, wherein the help text explains how to activate the object if the current state of the object is that the object is inactivated.

19. The apparatus as claimed in claim 15, wherein:
 the tooltip generation unit generates the tooltip by reading one of a plurality of text phrases respectively corresponding to a plurality of different states of the object stored in a storage unit; and
 the tooltip is applied to the object using an operating system (OS) of a host device in which the GUI is executed.

* * * * *